Jan. 1, 1929.
P. G. ZIMMERMANN
AIRPLANE WING
Filed Nov. 22, 1921   5 Sheets-Sheet 1
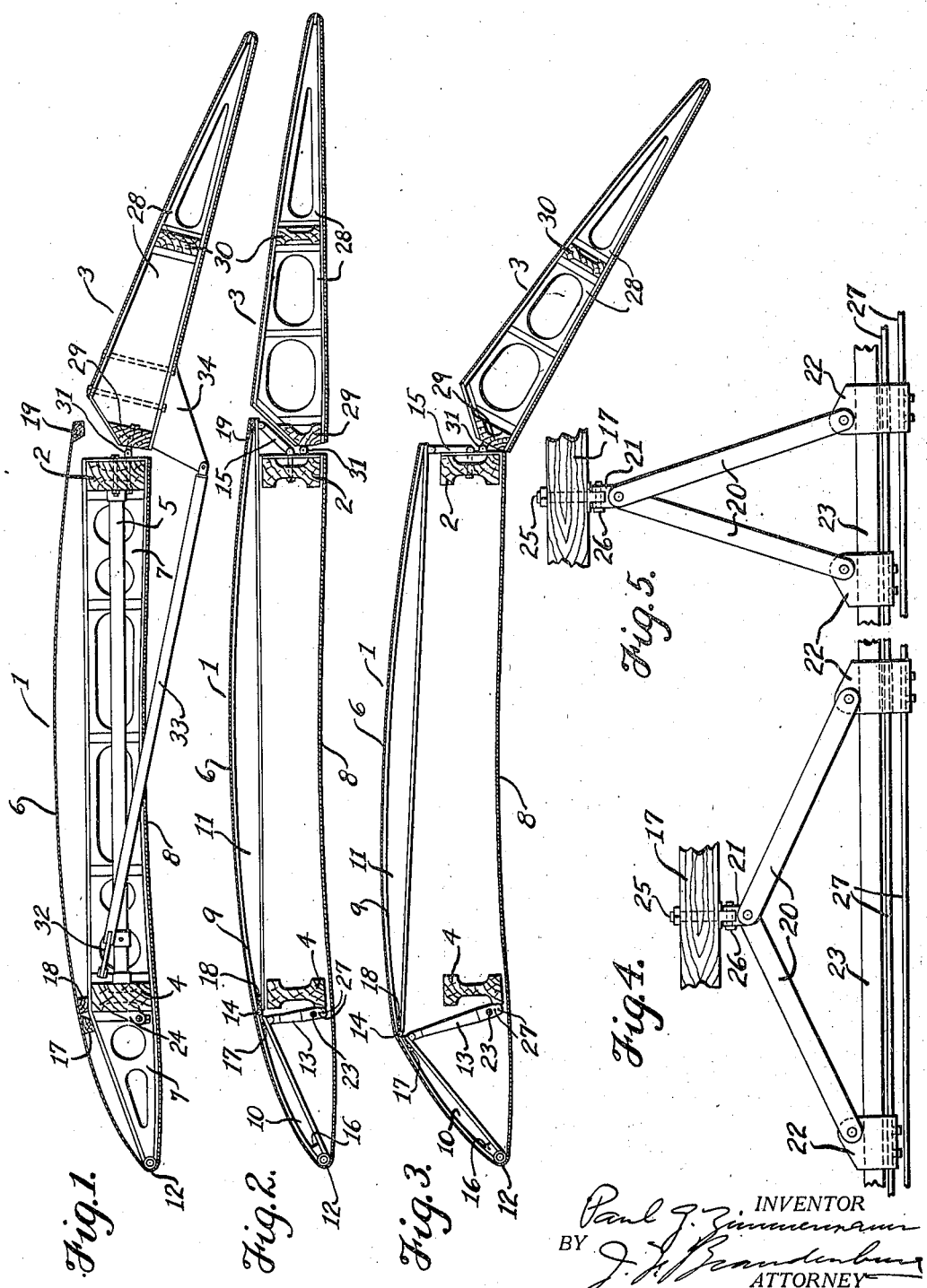

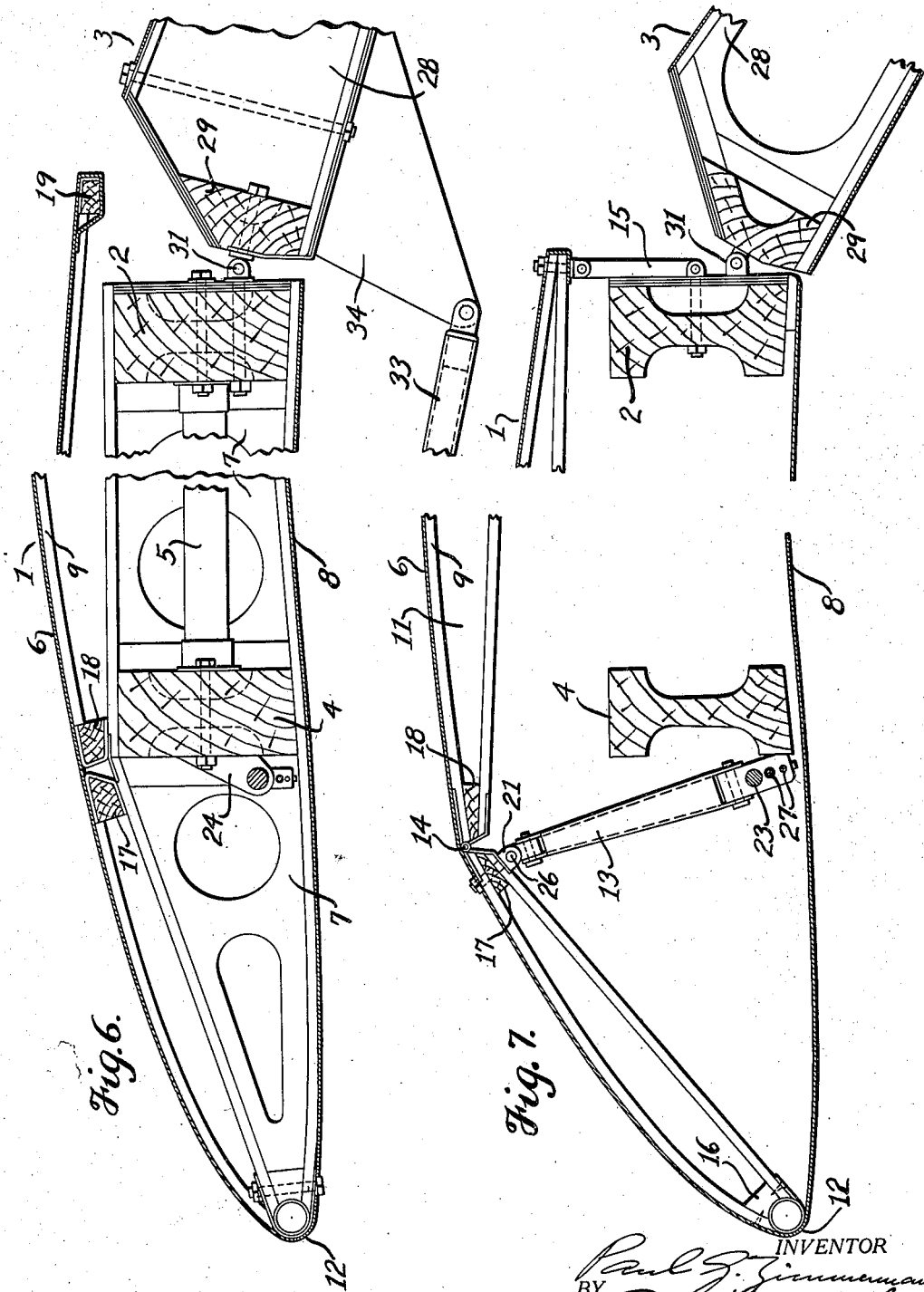

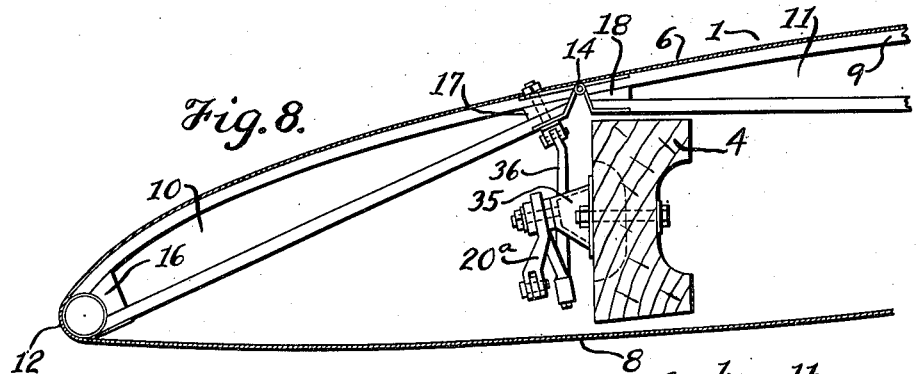
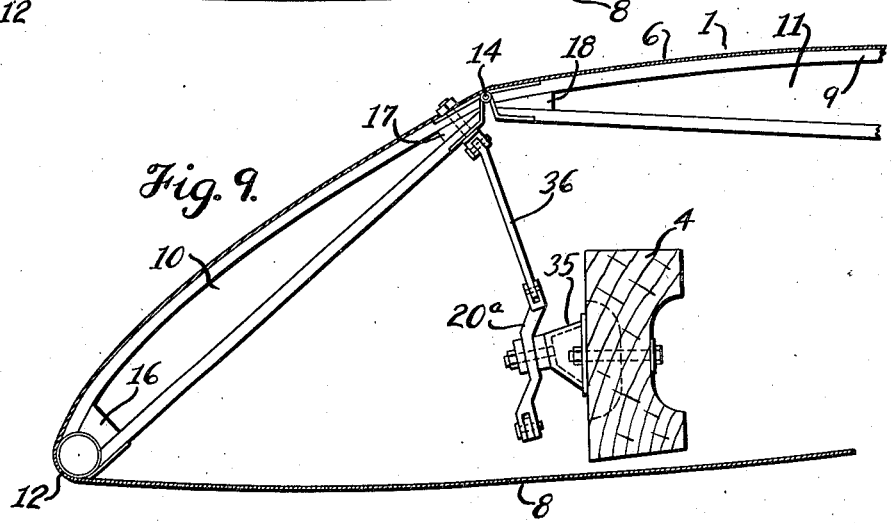
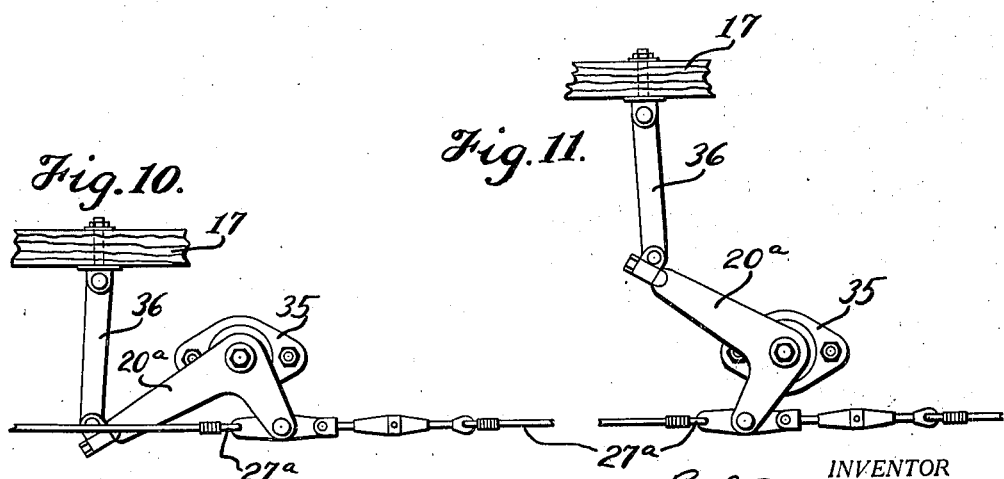

Jan. 1, 1929.                         1,697,674
P. G. ZIMMERMANN
AIRPLANE WING
Filed Nov. 22, 1921          5 Sheets-Sheet 4
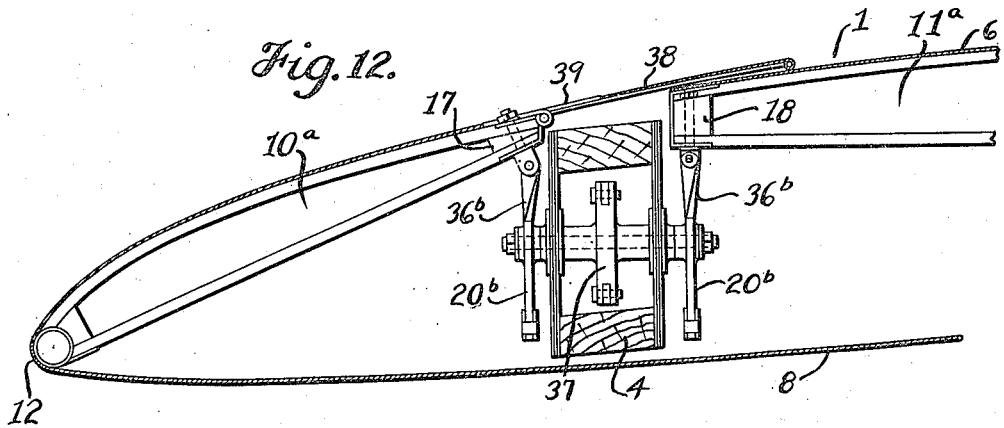
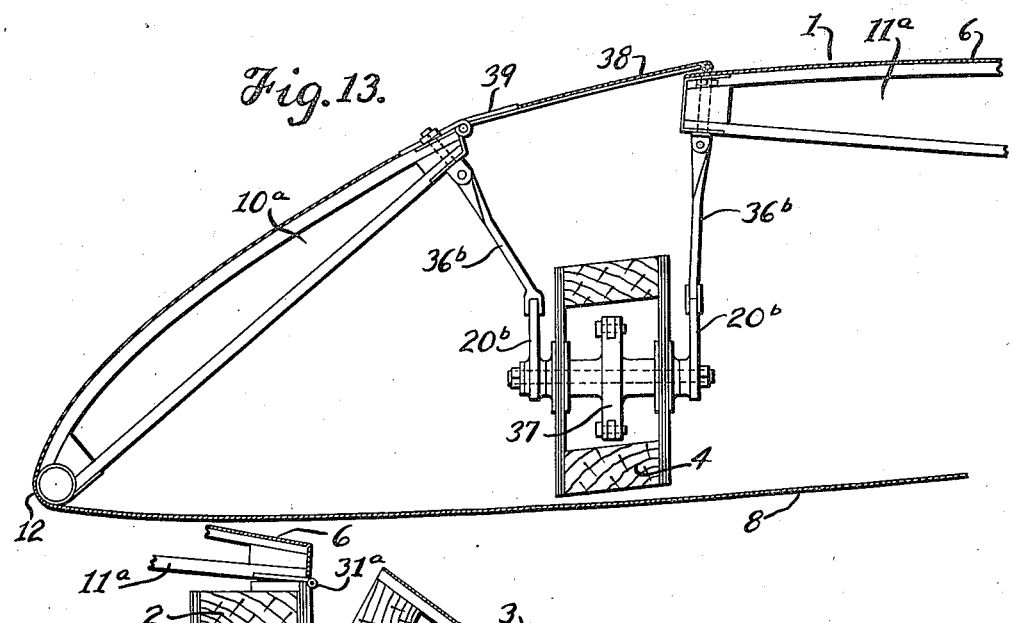
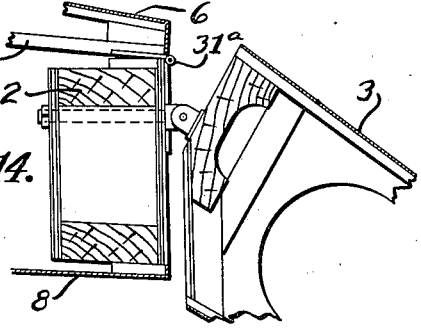
INVENTOR
Paul G. Zimmermann
BY
ATTORNEY

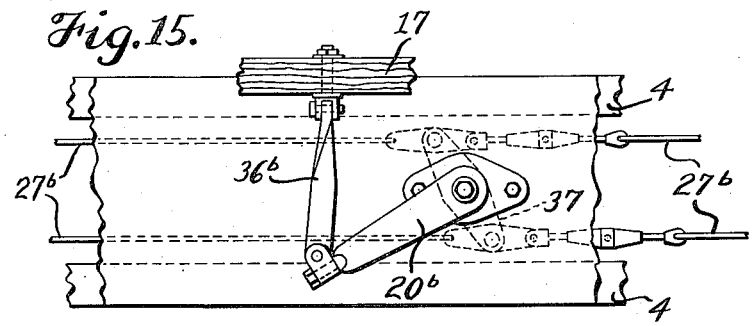
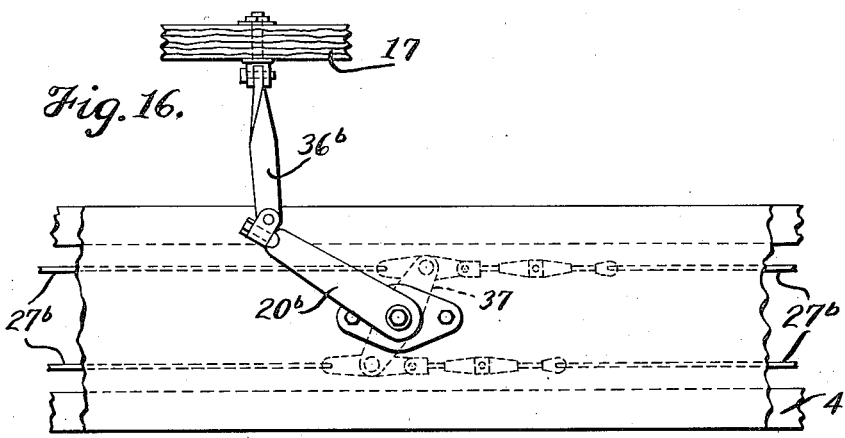
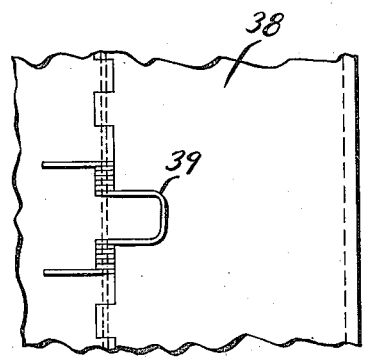

Patented Jan. 1, 1929.

1,697,674

UNITED STATES PATENT OFFICE.

PAUL G. ZIMMERMANN, OF KEYPORT, NEW JERSEY, ASSIGNOR OF ONE-FOURTH TO JOSEPH F. BRANDENBURG, OF NEW YORK, N. Y.

AIRPLANE WING.

Application filed November 22, 1921. Serial No. 516,931.

The invention relates to airplane wings, and the object is to make possible a very radical and advantageous alteration in the form of the wing in flight. Thick and deeply cambered wings have an unusually high lift coefficient, and are suitable for low speed, such as at take-off and at landing or alighting. Thin flat wings, on the other hand, have a low lift coefficient but offer very little resistance to propulsion, and therefore are suitable for high speed of flight.

The subject of this invention is a wing which can be changed in flight from a high-lift to a high-speed wing and vice-versa, by breaking the upper side of the wing at a given point or points, thus varying the thickness of the wing while preserving the curvature of the upper side in front and in rear of the break.

In the accompanying drawings forming a part hereof:

Fig. 1 is a transverse or fore-and-aft section through a wing or aerofoil structure embodying the invention, showing the thin flat condition of the main part of the wing;

Fig. 2 is a similar section taken in a different plane, showing the same condition in respect to the main part of the wing but with the rear flap in a different position;

Fig. 3 is a section on the same plane as Fig. 2, showing the change to a thick, virtually deeply cambered form and showing also the rear flap lowered to a position which is advantageous in connection with this condition;

Fig. 4 is an enlarged detail front elevation, showing a pair of operating arms within the wing in the position corresponding to Fig. 2;

Fig. 5 is a similar view, showing the arms in a position corresponding to Fig. 3;

Fig. 6 is an enlarged section, similar to Fig. 1, with an intermediate part of the body of the wing broken out and the rear of the flap broken away;

Fig. 7 is a similar enlarged section corresponding to Fig. 3;

Fig. 8 is an enlarged fore-and-aft section through the forward part of the wing, showing another form of the operating mechanism;

Fig. 9 is a similar view, showing the adjustment for high-lift;

Figs. 10 and 11 are front elevations of this form of operating mechanism in positions corresponding to Figs. 8 and 9;

Figs. 12 and 13 are views similar to Figs. 8 and 9 showing another form of construction;

Fig. 14 is a fore-and-aft section taken at the region of the rear beam in this construction;

Figs. 15 and 16 are front elevations of the operating mechanism shown in Figs. 12 and 13, in corresponding positions; and Fig. 17 is a fragmentary section showing a portion of a cover for the gap over the front beam involved in this construction.

The wing illustrated in these views comprises a main body, marked 1, extending from the nose to the rear beam 2, and a rear hinged flap 3 constituting the part of the wing behind the rear beam. The main strength members of the wing, that is to say the front and rear beams 4 and 2, and the struts and internal braces such as 5, may be of any conventional design, except that in the embodiments shown the tops of the beams are spaced below the upper surface 6 of the wing when the wing is in its condition of minimum thickness. In the drawings two sets of rigid ribs are fitted to the strength members, one set of ribs being fixed and the other set being adjustable.

The fixed rigid ribs, marked 7, have their lower edges formed to a suitable shape, found by wind tunnel experiments, to determine the shape of the lower surface 8 of the wing. Their upper edges may have any form suitable for design and independent of aerodynamic requirements. As seen in Figs. 1 and 6, for example, these ribs are substantially narrower vertically than the thickness of the wing in its thinnest and flattest condition, their upper edges, like the upper edges of the beams, being spaced below the upper surface 6.

The adjustable rigid ribs 9 seen in Figs. 2, 3 and 7, for example, have their upper edges shaped to determine the upper surface of the wing, while the shape of their lower edges is immaterial. These ribs are advantageously quite narrow in the vertical direction. The said adjustable ribs or rib structures are constituted of a plurality of parts, specifically a front part 10 and a rear or major part 11. The front part 10 is hinged at 12 to the leading edge, and thence extends rearward for a suitable distance, preferably terminating over and in front of the front beam. The rear part 11 is hinged or flexibly connected in some manner to the rear beam, so that it can be tilted upwardly at the front, and extends forward over the two beams 2 and 4 into proximity to the rear end of the part 10. Means 13 are provided within the wing under the control of the aviator for raising and lowering these proximate portions to vary the elevation of the upper surface 6 relatively to the stationary lower surface 8, and thereby to vary the thickness and to obtain the effect of varying the camber of the wing while actually preserving fixed curvatures, as will be seen in the drawings.

In the construction represented by Figs. 1 to 11 the proximate ends of the adjustable rib sections 10 and 11 are hinged together, as indicated at 14, and as this involves a forward movement of the rear section 11 when the parts are raised, it is desirable to provide a traveling pivot for the rear end of the said section. In the particular construction shown, this is accomplished by means of a link or links 15, pivoted at their lower ends to fittings on the back of the rear beam 2 and at their upper ends to the section 11, these links inclining rearward in the flat condition of the wing seen in Fig. 2 and being substatially vertical in the thick condition seen in Fig. 3. It will be understood that the several forward rib sections 10 of the wing are connected together in one structure by suitable transverse connecting elements, including strips 16, 17, and that the sections 11 are also connected by like strips 18, 19.

The mechanism for operating the adjustable wings shown in Figs. 1 to 7 comprise a suitable number of pairs of toggle arms 20, which are pivoted at their upper ends to a fitting 21 secured to the strip 17, while their lower ends are pivoted to slides 22 movable longitudinally and rotatably upon a horizontal rod 23, which is supported in suitable brackets 24 in front of and parallel with the lower portion of the beam 4. The fitting 21 is pivoted to the bolt or fastening 25, which secures it to the strip 17, the axis of this pivot 26 being at right angles to the pivots of the arms 20, so as to allow for the fore and aft swinging movement of the arms which takes place simultaneously with their swinging movement transverse to the direction of flight. The arms 20 are moved in opposite directions along the guide 23 by aid of suitable cables 27, which pass in an appropriate manner to a handle or lever accessible to the aviator.

Behind the rear spar 2 is a third set of movable ribs 28 determining the shape of the rear flap 3. This flap or wing section has beam members 29 and 30, and extends the full length of the wing or any part of it, but is preferably coextensive with each wing or half of the supporting plane at one side of the longitudinal center of the plane. The flap is flexibly connected to the body of the wing by a hinge 31 between the beams 2 and 29. The flap is shown as being operable by means of a bell-crank 32 and a push-and-pull rod 33 connected at its rear end to a control arm 34 projecting downward from the forward part of the flap. It will be understood that a suitable connection, not necessary to illustrate, passes from the bell-crank 32 to the aviator's place. This control may or may not be interconnected with the control of the adjustable rib sections 10 and 11, but in any event advantage is to be realized by adjusting the rear flap in connection with adjustments in the main part of the wing.

In the modification shown in Figs. 8 to 11, the adjustable ribs are operated by means of bell-crank arms $20^a$, which are pivoted on brackets 35 secured to the front of the forward beam, one arm of each bell-crank being connected to the strip 17 by a pivotal link 36 and the other arm being connected to an operating cable connection $27^a$.

In the particular construction illustrated in Figs. 12 to 17, the adjustable rib sections or structures $10^a$, $11^a$, corresponding to the sections 10 and 11 of the other forms are not hinged together at their proximate ends, the section $11^a$ being hinged to the rear beam 2 on a fixed pivot $31^a$, as seen in Fig. 14. The two sections are simultaneously raised and lowered by pairs of bell-crank arms $20^b$ at opposite sides of the front beam 4, which is shown of boxed construction. Links $36^b$ connect these arms with the ends of the sections $10^a$ and $11^a$ and the arms are simultaneously operated by means of an arm or arms 37 within the beam on a shaft to which the arms $20^b$ are secured, in connection with suitable cables $27^b$ connected to the inner arms and passing lengthwise of the beam. The gap over the beam between the proximate portions of the rib sections is closed by a cover 38 hinged to the rear end of the front section and of sufficient width to overlap and slide upon the upper surface of the rear section in all conditions of adjustment, the cover being held down by a spring 39 or any other elastic means indicated in Fig. 17.

Numerous other forms of construction will suggest themselves. In the various embodiments it will be seen that both the wing characteristics can be varied at will during flight, which is a very great advantage over either a wing of permanent thick shape or a wing of variable camber but of substantially fixed thickness if a large range of flying speeds is taken into consideration. For instance, in flying boat work it is very necessary to take off at the lowest possible speed as it is difficult, and destructive to the boat, to obtain a high speed over or through the water, it being likewise important to alight at low speeds, and this is one reason why it has been difficult in flying boats to obtain high speed of flight. By varying the depth or thickness of the wing the effect is obtained of increasing or decreasing the area of the wing, and as is well known a wing of minimum area and proper thickness gives the highest speed. Therefore, in a wing in which the thickness, and thereby the lift, can be increased or decreased at certain speeds, decided advantages are gained in connection with both flying boats and land planes.

The manner in which the upper side of the wing is changed in this invention by breaking it at one point or region, which is raised or lowered, the portions in front and rear of the break, with their rigid movable ribs, tilting without altering their top curvatures, is more practical and more advantageous than warping the curvature as has been attempted in ordinary variable camber wings.

In the case of comparatively thick wings, the fixed and adjustable ribs of the main part of the wing can be located in the same vertical plane, the adjustable ribs directly over the fixed ribs. For thinner wings, it is important to alternate the fixed and adjustable ribs, that is to say to locate the adjustable ribs between the fixed ribs.

It will be understood that by varying the thickness of the wing I mean such change in the thickness of the body of the wing as a whole as corresponds to the difference between thin and thick wings as the characteristics of such wings are known in the art.

What I claim as new is:

1. An airplane wing structure having adjustable ribs for determining the shape of the upper side, said ribs comprising sections hinged at the leading edge and sections hinged at a rear region, and means for raising and lowering the proximate portions of said sections.

2. An airplane wing structure having adjustable ribs for determining the shape of the upper side, said ribs comprising sections hinged at the leading edge and sections hinged at a rear region, arms within the wing connected to the proximate portions of said sections, and means for operating said arms.

3. An airplane wing structure comprising fixed ribs determining the shape of the lower side from the rear beam forwardly, adjustable rigid sectional ribs substantially extending from the leading edge to the rear beam determining the shape of the upper side, and a hinged flap extending rearward from the rear beam.

4. An airplane wing comprising the combination of movable rigid rib structures in three parts, the first hinged at the leading edge and extending rearward, the second hinged at the rear beam and extending forward, and the third hinged at the rear beam and extending rearward, and means for operating said rib structures at will.

5. An airplane wing structure having front and rear beams, adjustable rib parts for determining and varying the shape of the upper side, one part being hinged at the leading edge, the other part being hinged at the rear beam, and their proximate portions being in the region of the front beam, and means for raising and lowering said proximate portions.

6. An airplane wing structure having fixed ribs determining the shape of the lower side, and adjustable ribs lying in vertical planes between the fixed ribs, and means for raising and lowering said proximate portions.

7. In an airplane wing, ribs supporting the top covering, comprising forward and rearward sections fulcruming at their remote portions and separate at their proximate portions, means for raising and lowering the sections, coverings over the respective sections, and a cover to close the intermediate gap.

8. An airplane wing structure, comprising front and rear beams, fixed ribs determining the shape of the lower side of the plane from the rear beam forward to the leading edge, adjustable ribs pivoted at their front and rear ends and determining the shape of the upper side, wing trail portions extending from the rear beam, and operating means including cable and link connections for adjusting the upper ribs.

9. An airplane wing the upper side of which comprises a plurality of movable rigid sections, one behind another, and means for raising and lowering said sections to vary the thickness of the wing.

10. An airplane wing the upper side of which comprises a plurality of rigid hinged sections, one behind another, and means for raising and lowering said sections to vary the thickness of the wing.

11. An airplane wing the upper side of which comprises a rigid section hinged at the leading edge and at least one movable rigid section behind the forward section, and means for raising and lowering said sections to vary the thickness of the wing.

12. An airplane wing the lower side of which is fixed and the upper side of which comprises a plurality of movable rigid sections, one behind another, and means for raising and lowering said sections to vary the thickness of the wing.

13. An airplane wing the lower side of which is fixed and the upper side of which comprises a plurality of rigid hinged sections, one behind another, and means for raising and lowering said sections to vary the thickness of the wing.

14. An airplane wing the lower side of which is fixed and the upper side of which comprises a rigid section hinged at the leading edge and at least one movable rigid section behind the forward section, and means for raising and lowering said sections to vary the thickness of the wing.

PAUL G. ZIMMERMANN.